(12) United States Patent
Olson et al.

(10) Patent No.: US 7,707,398 B2
(45) Date of Patent: Apr. 27, 2010

(54) SYSTEM AND METHOD FOR SPECULATIVE GLOBAL HISTORY PREDICTION UPDATING

(75) Inventors: Timothy A. Olson, Austin, TX (US); Terrence Matthew Potter, Austin, TX (US); Jon A. Loschke, Austin, TX (US)

(73) Assignee: Applied Micro Circuits Corporation, San Diego, CA (US)

( * ) Notice: Subject to any disclaimer, the term of this patent is extended or adjusted under 35 U.S.C. 154(b) by 368 days.

(21) Appl. No.: 11/985,025

(22) Filed: Nov. 13, 2007

(65) Prior Publication Data
US 2009/0125707 A1     May 14, 2009

(51) Int. Cl.
*G06F 9/00*     (2006.01)
(52) U.S. Cl. .................. 712/240; 712/239; 712/234
(58) Field of Classification Search ............... 712/234, 712/239, 240
See application file for complete search history.

(56) References Cited

U.S. PATENT DOCUMENTS

| | | | | | |
|---|---|---|---|---|---|
| 5,634,119 | A | * | 5/1997 | Emma et al. ............... | 712/240 |
| 5,758,142 | A | * | 5/1998 | McFarling et al. ......... | 712/239 |
| 6,526,502 | B1 | * | 2/2003 | Col et al. .................. | 712/239 |
| 6,598,152 | B1 | * | 7/2003 | Sinharoy .................... | 712/228 |
| 6,721,875 | B1 | * | 4/2004 | McCormick et al. ....... | 712/233 |
| 6,738,897 | B1 | * | 5/2004 | Talcott ....................... | 712/240 |
| 6,766,441 | B2 | * | 7/2004 | Sinharoy .................... | 712/237 |
| 6,928,537 | B2 | * | 8/2005 | Henry et al. ............... | 712/240 |
| 6,976,157 | B1 | * | 12/2005 | Sinharoy .................... | 712/239 |
| 7,000,096 | B1 | * | 2/2006 | Sinharoy .................... | 712/240 |
| 7,165,169 | B2 | * | 1/2007 | Henry et al. ............... | 712/240 |
| 7,328,332 | B2 | * | 2/2008 | Tran .......................... | 712/238 |
| 7,647,488 | B2 | * | 1/2010 | Hikichi ...................... | 712/240 |
| 2002/0029333 | A1 | * | 3/2002 | Talcott ....................... | 712/239 |
| 2002/0188833 | A1 | * | 12/2002 | Henry et al. ............... | 712/236 |
| 2002/0194464 | A1 | * | 12/2002 | Henry et al. ............... | 712/239 |
| 2002/0194465 | A1 | * | 12/2002 | Sinharoy .................... | 712/239 |
| 2003/0149862 | A1 | * | 8/2003 | Kadambi .................... | 712/217 |
| 2004/0210749 | A1 | * | 10/2004 | Biles .......................... | 712/240 |

(Continued)

OTHER PUBLICATIONS

Skadron et al., "Speculative Updates of Local and Global Branch History: a Quantitative Analysis", University of Virginia, 1998.

(Continued)

*Primary Examiner*—Eddie P Chan
*Assistant Examiner*—Idriss N Alrobaye
(74) *Attorney, Agent, or Firm*—Law Office of Gerald Maliszewski; Gerald Maliszewski

(57) ABSTRACT

A system and method are provided for updating a speculative global history prediction record in a microprocessor system using pipelined instruction processing. The method accepts microprocessor instructions with consecutive operations, including a conditional branch operation with an associated first branch address. A speculative global history record (SGHR) of conditional branch resolutions and predictions is accessed and hashed with the first branch address, creating a first hash result. The first hash result is used to index a branch history table (BHT) of previous first branch resolutions. As a result, a first branch prediction is made, and the SGHR is updated with the first branch prediction. A non-speculative global history record (NSGHR) of branch resolutions is updated with the resolution of the first branch operation, and if the first branch prediction is incorrect, the SGHR is corrected using the NSGHR.

23 Claims, 3 Drawing Sheets

U.S. PATENT DOCUMENTS

| | | | |
|---|---|---|---|
| 2004/0225872 A1* | 11/2004 | Bonanno et al. | 712/239 |
| 2005/0149707 A1* | 7/2005 | Jourdan et al. | 712/239 |
| 2006/0248319 A1* | 11/2006 | Kadambi | 712/234 |
| 2007/0220239 A1* | 9/2007 | Dieffenderfer et al. | 712/240 |
| 2008/0189533 A1* | 8/2008 | Hayashi | 712/240 |
| 2009/0119494 A1* | 5/2009 | Blaner et al. | 712/239 |

OTHER PUBLICATIONS

Scott McFarling, "Combining Branch Predictors", WRL Technical Note TN-36, Digital Equipment Corp., Jun. 1993.

* cited by examiner

IF - INSTRUCTION FETCH
IC - INSTRUCTION CACHE ACCESS
ID - INSTRUCTION DECODE
RS - REGISTER READ
Sch - SCHEDULE
EX - EXECUTE
WB - WRITE BACK TO REGISTER FILE

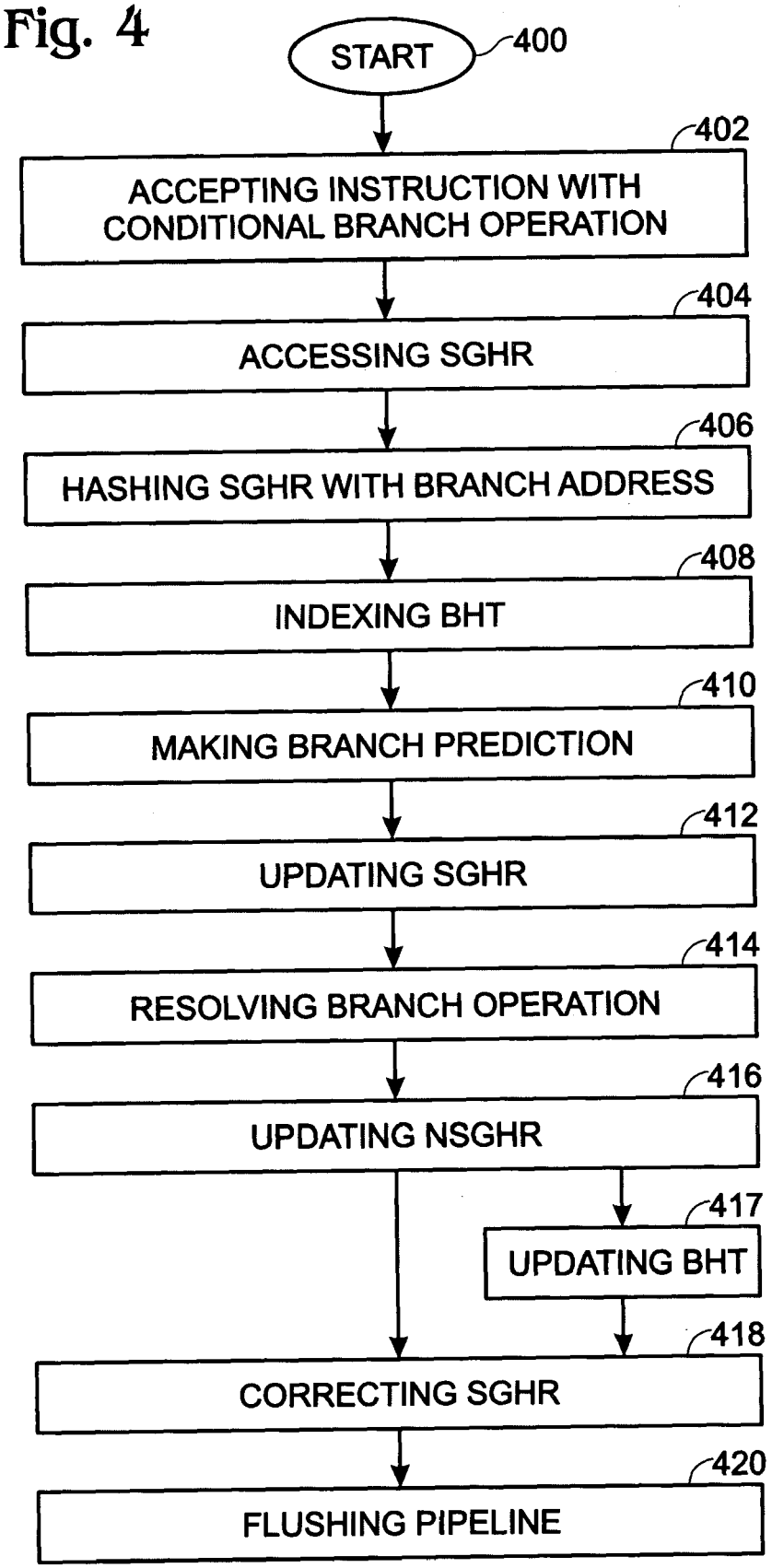

SYSTEM AND METHOD FOR SPECULATIVE GLOBAL HISTORY PREDICTION UPDATING

BACKGROUND OF THE INVENTION

1. Field of the Invention

This invention generally relates to a computer-instruction pipeline and; more particularly, to a system and method for improving speculative global history predictions associated with the use of a pipeline.

2. Description of the Related Art

FIG. 1 is schematic block diagram depicting a processor pipeline (prior art). In central processing units of general purpose computers, micro-architectures have evolved that permit the simultaneous processing of multiple instructions for the purpose of increasing computational performance. One technique is to pipeline the various steps needed to execute an instruction, allowing many instructions to be in various stages of execution simultaneously. As noted in U.S. Pat. No. 6,938,151, the basic dataflow for an instruction is: instruction fetch (IF), decode (ID), cache access (IC), execute (EX), and result write back (WB). Each stage within the pipeline must occur in order. In order to achieve high performance, one new instruction enters the pipeline every cycle, and each instruction in the pipeline moves to a new stage. Each stage takes inputs and produces outputs, which are stored in an output buffer associated with the stage. One stage's output buffer is typically the next stage's input buffer. Such an arrangement permits all the stages to work in parallel and therefore yields a greater throughput than if each instruction had to pass through the entire pipeline before the next instruction could enter the pipeline. When the pipeline is delayed or has to be cleared, latency is created in the processing of each instruction in the pipeline.

There are many dependencies between instructions that prevent the optimal case of a new instruction entering the pipeline every cycle. These dependencies add latency to the pipeline. One category of latency contribution deals with branches. A conditional branch is an instruction which can either fall though to the next sequential instruction (branch not taken), or branch off to another instruction address (branch taken), and carry out the execution of a different series of code. Conditional branches take the branch (that is, start executing at the target address instead of the next sequential address) if the condition evaluates to true. For example, in the Power architecture, the compare instruction compares two operands and sets the condition register. Then a following branch-if-equal instruction would branch if the two operands are equal. The compare tests the conditional and the "conditional" branch resolves to "taken" if the condition is true. The result of the taken/not taken issue is called a "resolution".

At decode time, the branch is detected. Latency in the pipeline is created while waiting for the resolution of the branch. This latency is compounded as each instruction in the pipeline is delayed waiting for the resolution of the branch.

To overcome these latencies, the direction of the branch can be predicted such that the pipeline begins decoding, based upon the assumption that the branch is either taken or not taken. At branch resolution time, the prediction is compared to the actual results (the resolution). If the prediction is correct, latency has been minimized. If the prediction is incorrect, then decoding has proceeded down the improper path and all instructions in this path behind that of the incorrect prediction must be flushed out of the pipeline. The pipeline is restarted at the correct instruction address to begin decoding the resolved branch direction. Correct predictions minimize latency, while incorrect predictions, because of the flushing and restart operations, add greater latency than simply waiting for the branch to resolve before decoding. Thus, latency is significantly improved by making correct branch predictions.

In order to improve the accuracy of the predictions, a Branch History Table (BHT) can be implemented, which permits future predictions to be based upon the resolution of previous branch instructions. There are many algorithms for dynamically predicting a branch. One approach is to maintain a 2-bit saturating counter. Each counter has 4 states encoded as 00: strongly not taken, 01: weakly not taken, 10: weakly taken, 11: strongly taken, see Table 1. If the BHT tracks a branch either strongly not taken or weakly not taken, and the branch is resolved not taken, then the state becomes strongly not taken.

TABLE 1

| Predictor value meaning | |
| --- | --- |
| Counter value | Prediction |
| 00 | Strongly NOT Taken |
| 01 | Weakly NOT Taken |
| 10 | Weakly Taken |
| 11 | Strongly Taken |

Further, there are different algorithms associated with the way that each table is indexed, which have profound differences on prediction accuracy. For branches which close off loops, the prediction will be correct $(X-1)/X$ amount of the time, where X is the times the loop is processed. An indexing scheme that uses the branch instruction address works very well in such a situation. In the cases of IF/THEN/ELSE branch structures, where the direction has a higher level of conditional-based information, determining where the branch occurs and XOR'ing the pattern of the last N predictions provides a higher level of accuracy. This pattern of previous predictions may be referred to as a Global History Prediction with Index Sharing, or Gshare (Scott McFarling, "Combining Branch Predictors", Western Research Laboratory Technical Note TN-36, 1993). Gshare predicts whether a branch is taken according to a historic index based on the instruction address, and is useful because branch instructions sometimes have the tendency to correlate to other nearby instructions.

FIG. 2 is a schematic block diagram depicting a Gshare scheme for indexing a BHT (prior art). The BHT is indexed by a number which is formed from hashing the address of the branch instruction with the value in a Global History Shift Register (GHSR). If the BHT contains $2^N$ predictors, N bits are needed to select a predictor. The GHSR is typically a shift register of M bits, where M is usually less than N. When the branch is resolved, the value in the GHSR is updated by shifting in a "1" if the branch is taken and a "0" if the branch is not taken. The effect is to form a pattern of 1's and 0's which reflect the directions taken by the M most recent branches. This number (GHSR) is exclusive-OR'ed with the branch address, typically the lower order address bits, to form the N-bit index. This index is then used to select the predictor in the BHT.

A problem arises when this scheme is used in a pipelined micro-architecture. As shown in FIG. 1, instruction execution in a pipelined processor is divided into a number of stages, where a specific operation occurs in each stage. In the example, instruction fetch occurs in stage 0. To fetch an instruction, a fetch address must be calculated in the Instruction Fetch (IF) stage. This address is used to access the instruction from the instruction cache or memory in the IC stage. The instruction is decoded in the ID stage. The register values are read in the RS stage and the instruction is scheduled for execution in the Sch stage. The instruction is actually executed in the EX stage and the result value is written back to the register file in the WB stage.

In this type of pipeline, the instruction type is not known until it reaches the decode stage (ID). Further, the branch is not resolved until it reaches the EX stage, when it is executed. This leads to two problems which arise when implementing the Gshare branch prediction scheme: 1) the latency between the branch prediction and the instruction fetch stage and 2) the necessity to wait until the EX stage, when the branch is resolved, to update the GHSR and the prediction counters.

If the BHT is accessed in stage 1 (IC), at the same time as the instruction cache access, hardware can be added to calculate the branch target address in the next stage (RS) and the branch target address can be formed. If the branch prediction indicates that the branch should be taken, the instructions which are in earlier stages of the pipeline are discarded, and the branch target address is used in the IF stage to start a new prefetch stream. The discarded instructions represent work that is lost because of the latency in the pipeline between the IF stage and the branch prediction stage. The number of stages between these operations should be minimized for efficiency. Since the GHSR value is needed to form the index into the BHT, and the value IS formed using the outcome of the branch instruction, then BHT access, and thus the branch prediction, must conventionally wait until the branch is resolved and the GHSR is updated. In the example pipeline of FIG. 1, the branch resolution is determined in stage 5 (EX). Thus, the redirection of the fetch stream has 5 stages of latency (from stage 0 to stage 5) if the branch prediction is incorrect, causing a further loss of efficiency.

One solution to this problem is to use a GHSR value that is formed later in the pipeline to predict the branch instructions in the RS stage. This approach would mean that there might be one or more branches in the pipeline which do contribute to updating the GHSR. In other words, any given prediction would be based on "old" information. This approach leads to a lower prediction accuracy.

Another solution to this problem is to "speculatively" update the GHSR, and, possibly, the BHT. In this case, speculative means that the branch prediction formed by accessing the BHT is used to speculatively update the GHSR with a taken/not taken value. Of course, the branch may ultimately be resolved to disagree with the prediction. This result is called a branch mispredict. If the branch is mispredicted, then the GHSR has been updated with erroneous information. Similarly, if the BHT entries are updated with predicted branch information that is later found to be erroneous, it too is corrupted.

It would be advantageous if the information in a GHSR could be purged and corrected when the branch prediction are found to be false at branch resolution time.

SUMMARY OF THE INVENTION

A means is presented for "repairing" a global history record (GHR) such that it represents the actual outcome of the branch predictions. The method uses two GHRs that are updated at different points in the pipeline. A speculative GHR is updated with predicted branch decisions early in the pipeline (for instance in stage 3, see FIG. 1) and a resolved (non-speculative) GHR is updated with actual branch decisions when the branch is resolved later in the pipeline (for instance in stage 5). When a branch resolves, the taken/not-taken decision is compared with the earlier prediction. If the resolution does not agree with the prediction, the value in the resolved GHR is copied into the speculative GHR, causing the speculative GHR to have the correct information for all branches up to the last one resolved. Since the pipeline is flushed of all instructions up until this branch, any predictions for branch instructions based upon the incorrect information can also be discarded. The difference between correct and incorrect information is associated with the difference between the values in the speculative and resolved GHRs.

Accordingly, a method is provided for updating a speculative global history prediction record in a microprocessor system using pipelined instruction processing. The method accepts microprocessor instructions with consecutive operations, including a first conditional branch operation with an associated first branch address, at a first stage in a pipelined microprocessor execution process. A speculative global history record (SGHR) of conditional branch resolutions and predictions is accessed. The speculative global history record is hashed with the first branch address, creating a first hash result. The first hash result is used to index a branch history table (BHT) of previous first branch resolutions. In response to indexing the BHT, a first branch prediction is made, and the speculative global history record is updated with the first branch prediction. A non-speculative global history record (NSGHR) of branch resolutions is updated with the resolution of the first branch operation, and in response to the first branch prediction being incorrect, the speculative global history record is corrected using the non-speculative global history record.

More explicitly, the speculative global history record is corrected by copying the values in the non-speculative global history record into the speculative global history record. Further, if the first branch prediction is incorrect, subsequently accepted microprocessor instructions, which were processed in response to the first branch prediction in the speculative global history record, are flushed.

Additional details of the above-described method and a pipelined instruction microprocessor system with a speculative global history prediction record are provided below.

BRIEF DESCRIPTION OF THE DRAWINGS

FIG. 4 is a flowchart illustrating a method for updating a speculative global history prediction record in a microprocessor system using pipelined instruction processing.

DETAILED DESCRIPTION

Figure 1:
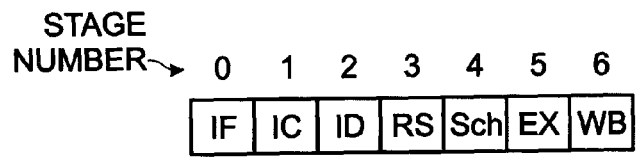
FIG. 1 is a schematic block diagram depicting a Gshare scheme for indexing a BHT (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware; in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 3:
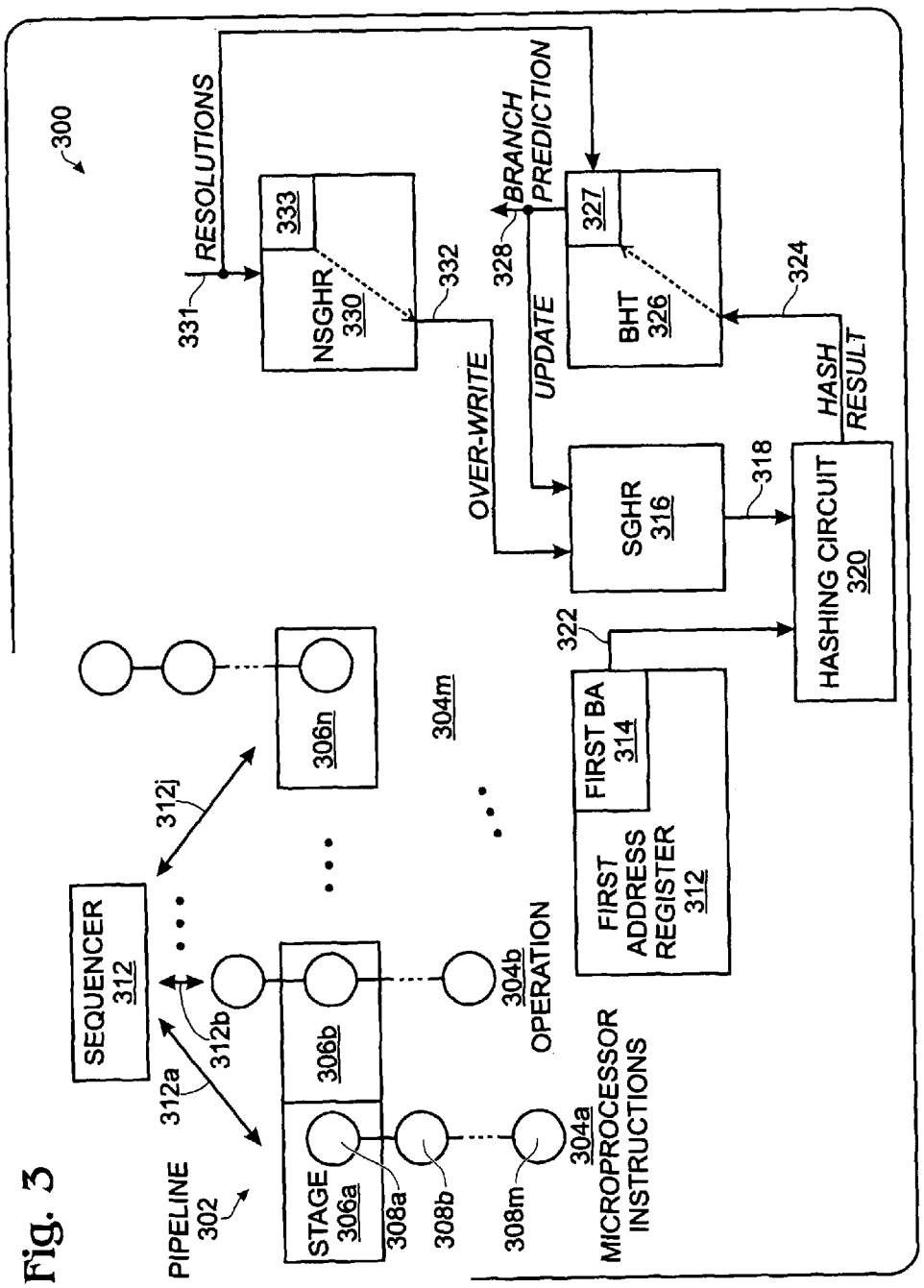
FIG. 3 is a schematic block diagram depicting a pipelined instruction microprocessor system with a speculative global history prediction record.

FIG. 3 is a schematic block diagram depicting a pipelined instruction microprocessor system with a speculative global history prediction record. The 300 system comprises a pipeline 302 including a plurality of sequential stages for parallel processing microprocessor instructions. Microprocessor instructions 304a through 304m are depicted, where m is not limited to any particular value. Stages 306a through 306n are depicted, where n is not limited to any particular number. For example, FIG. 1 depicts a pipeline example where n=6. Returning to FIG. 3, in some aspects n=m. Each microprocessor instruction includes a plurality of consecutive operations. Microprocessor instruction 304a is depicted as including operations 308a through 308k, where k is not limited to any particular value. Although not explicitly labeled with reference designator, microprocessor instructions 304b through 304m likewise include a plurality of operations depicted as circular elements. In some aspects, the number of operations in a microprocessor instruction equals the number of stages 306 in pipeline 302. The pipeline 302 includes one or more stages for processing a conditional branch operation. For example, first stage 306a may process a first conditional branch operation 308a from a first microprocessor instruction 304a.

A sequencer 310 has an interface on line 312 (312a through 312j) for accessing the pipelined stages and processing the operations. For example, sequencer 310 may be a computer processor such as a reduced instruction set computer (RISC). A first address register 312 contains a first branch address (BA) 314 associated with the first conditional branch operation 308a. Also shown is a speculative global history record (SGHR) 316, which has an output on line 318 to supply a history of conditional branch resolutions and predictions. Typically, the speculative global history record 316 is a shift register. A hashing circuit 320 has an input on line 318 to accept the SGHR output, an input on line 322 to accept the first branch address, and an output on line 324 to provide a first hash result. In one aspect the hashing circuit 320 performs an exclusive-OR (XOR) operation between a value representing the speculative global history record and a value representing the first branch address. However, other types of hashing are also known in the art.

Figure 2:
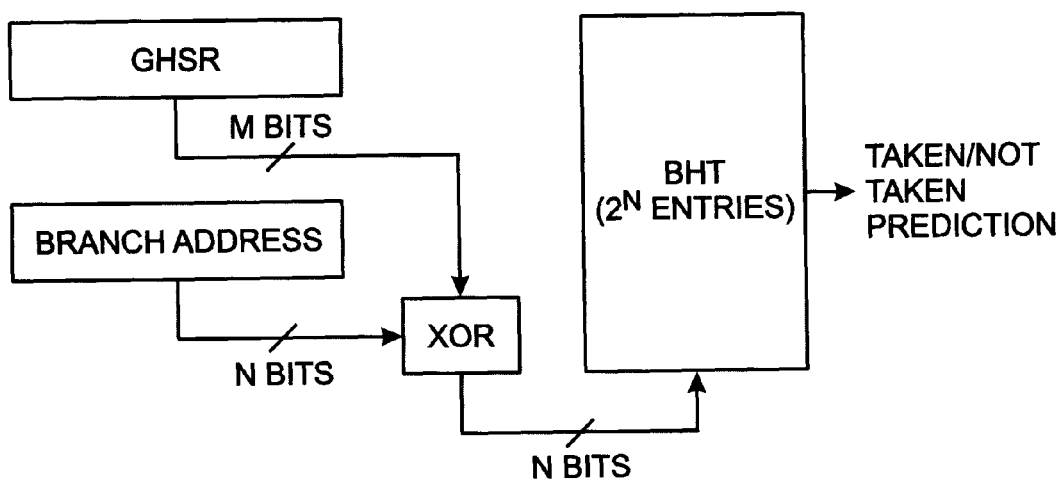
FIG. 2 is schematic block diagram depicting a processor pipeline (prior art).

A branch history table (BHT) 326 has an input on line 324 to accept the first hash result. The BHT 326 indexes previous first branch resolutions 327 associated with the first hash result and provides a first branch prediction on line 328. The SGHR 316 is updated with the first branch prediction. In one aspect, the BHT 326 includes a count of the n-most recent first branch resolutions. For example, FIG. 2 depicts an example where n=4. Returning to FIG. 4, in one aspect the BHT 316 clamps the count to a maximum value of $m=2^n-1$, and clamps the count to a minimum value of zero. Thus, the BHT first branch prediction indicates a degree of confidence in the assumption that the first branch is taken (or not taken). It is also typical for the BHT 326 to be updated with the first branch resolution on line 331. Thus, the BHT first branch prediction degree of confidence is modified in response to updating the BHT with the first branch resolution on line 331. Alternately, the BHT may be updated with predictions, which are corrected after the branch is resolved.

In one aspect of the system, each branch is associated with a "static" branch prediction bit in the instruction itself. The compiler software will set the static bit such that the hardware elements in the system (not shown) can determine the most likely branch direction. That is, if there is no other branch prediction help, hardware elements in the system may use the static branch prediction. Then, the use of branch prediction hardware may result in a BHT that produces "agree" or "disagree" decisions that apply to the static prediction bit. If the static prediction bit is "taken" and if the BHT "agrees", then the prediction is used. If the BHT "disagrees" then the prediction is not used. Likewise, if the static branch prediction is "not taken" and the BHT "disagrees", then the branch prediction is used.

A non-speculative (resolved) global history record (NS-GHR) 330 of branch resolutions has an input on line 331 to accept first branch resolutions 333 and an output on line 332 for over-writing the SGHR 316 in response to the first branch prediction being incorrect. Typically, the NSGHR 330 is a shift register. In one aspect of the system, the NSGHR 330 is completely copied into the SGHR 316. In this aspect there is no need to track which portions in the SGHR 316 need to be over-written. The BHT 326 increments the count in response to the first branch instruction being taken and decrements the count in response to the first branch instruction not being taken. This example assumes that higher value counts are associated with "taken" predictions and lower value counts are associated with "not taken" predictions.

In one aspect, the pipeline 302 flushes microprocessor instructions (not shown) accepted subsequent to the first microprocessor instruction 304a in response to the subsequently accepted microprocessor instructions being processed using the incorrect first branch prediction in the speculative global history 316.

Although the system 300 of FIG. 3 has been depicted as a collection of connected modules, implying hardware, it should be understood that portions of the system may be enabled as coded instructions, stored in memory, and enabled using microprocessors or logic-coded state machines.

Functional Description

In deeply pipelined processors, successful dynamic branch prediction is crucial to high speed operation. Consequently, a number of branch prediction mechanisms have been developed. One specific mechanism is the Gshare branch prediction mechanism in which a vector is created which captures the outcome of a fixed number of branches that have been executed immediately before the current instruction fetch. This vector is typically created by shifting a logic 1 or logic 0 into the last position of a shift register when the outcome of a given branch is determined, with a logic 1 representing a branch taken outcome and a logic 0 representing a branch not taken outcome. The bits of the vector are then bitwise XOR'ed with appropriate bits of the current branch instruction address. The resulting address is used to index into a branch history table entry, which typically is a counter that maintains a value used for making the prediction (taken/not taken) for the branch.

The speculative GHSR, in general, contains some number of resolved branch decisions and some number of "predicted" branch decisions. The resolved decisions are there because they are copied from the "non-speculative" GHSR into the speculative GHSR when a misprediction is detected. The predicted decisions are shifted into the GHSR when a branch prediction is made.

The principle advantage of updating the speculative GHR is to increase the probability of correct predictions. Duplication of a GHSR at the predict stage and at the resolution or commitment stage requires very little increase in logic complexity. Since the GHSR itself is a small amount of logic, the price to be paid for duplication of the logic in the GHSR is small. However, this duplication permits speculative updates (resolutions) to be passed down the pipeline to be used in the repair of the GHSR. Another technique for repairing a GHSR, is known as Outstanding Branch Queue (OBQ) (Skadron et al., "Speculative Updates of Local and Global Branch History: A Quantitative Analysis", University of Virginia, 1998). This mechanism requires the saving of information for the GHSR in an OBQ. The OBQ must be forwarded down the pipeline to the branch resolution stage in order to "back out" the speculative changes to the GHSR. This requires that each branch update to the GHSR be kept somewhere (the OBQ) and then the "repair" must be done only for those branches that were in the mispredicted path. This requires "picking" and "merging" logic, which, while possibly smaller than maintaining an entire GHSR, is substantially more complex to implement and test.

FIG. 4 is a flowchart illustrating a method for updating a speculative global history prediction record in a microprocessor system using pipelined instruction processing. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 400.

Step 402 accepts a first microprocessor instruction of consecutive operations, including a first conditional branch operation with an associated first branch address, at a first stage in a pipelined microprocessor execution process. Step 404 accesses a speculative global history record of conditional branch resolutions and predictions. Step 406 hashes the speculative global history record with the first branch address, creating a first hash result. In one aspect, Step 406 performs an exclusive-OR operation between a value representing the speculative global history record and a value representing the first branch address.

Step 408 uses the first hash result to index a branch history table of previous first branch resolutions. In one aspect, using the first hash result to index the BHT in Step 408 includes indexing a count of the n-most recent first branch resolutions. In response to indexing the BHT, Step 410 makes a first branch prediction. Step 412 updates the speculative global history record with the first branch prediction. In one aspect, Step 412 enters a value representing the first branch prediction into a speculative global history shift register.

Step 414 resolves the first branch operation. Step 416 updates a non-speculative global history record of branch resolutions with the resolution of the first branch operation. In one aspect, Step 416 enters a value representing the first branch resolution into a non-speculative global history shift register. In response to the first branch prediction being incorrect, Step 418 corrects the speculative global history record using the non-speculative global history record. Typically, Step 418 copies the value(s) from the non-speculative global history record into the speculative global history record. In one aspect, Step 420 flushes subsequently accepted microprocessor instructions processed in dependence upon the first branch prediction in the speculative global history record if the first branch prediction is incorrect.

In one variation, Step 417 updates the BHT with the first branch resolution. For example, updating the BHT with the first branch resolution may include: incrementing the count in response to the first branch being taken; or, decrementing the count in response to the first branch not being taken. In one aspect, incrementing the count includes clamping the count to a maximum value of $m=2^n-1$, while decrementing to the count includes clamping the count to a minimum value of zero.

In another aspect, using the first hash result to index the BHT of previous first branch resolutions (Step 408) includes indexing a BHT indicating a degree of confidence in the assumption that the first branch is taken. Then, updating the BHT with the first branch resolution in Step 417 includes modifying the degree of confidence in response to the first branch resolution.

A system and method have been presented for updating a speculative global history prediction record in a microprocessor pipeline. Examples have been given to illustrate the invention. However, the invention is not limited to merely these examples. It should also be appreciated that the specific details of the pipeline given are for illustrative purposes only. The technique of speculative update of the GHSR and BHT can be used in other pipeline architectures, including but not limited to: out-of-order execution and parallel or "superscalar" architectures.

We claim:

1. In a microprocessor system using pipelined instruction processing, a method for updating a speculative global history prediction record, the method comprising:
accepting a first microprocessor instruction of consecutive operations, including a first conditional branch operation with an associated first branch address, at a first stage in a pipelined microprocessor execution process;
accessing a speculative global history record (SGHR) of conditional branch resolutions and predictions;
hashing the speculative global history record with the first branch address, creating a first hash result;
using the first hash result to index a branch history table (BHT) of previous first branch resolutions;
in response to indexing the BHT, making a first branch prediction;
updating the speculative global history record with the first branch prediction;
resolving the first branch operation;
updating a non-speculative global history record (NS-GHR) of branch resolutions with the resolution of the first branch operation;
in response to the first branch prediction being incorrect, correcting the speculative global history record using the non-speculative global history record; and,
wherein hashing the speculative global history record with the first branch address includes performing an exclusive-OR (XOR) operation between a value representing the speculative global history record and a value representing the first branch address.

2. The method of claim 1 wherein correcting the speculative global history record includes copying the value from the non-speculative global history record into the speculative global history record.

3. The method of claim 2 further comprising:
in response to the first branch prediction being incorrect, flushing subsequently accepted microprocessor instructions processed in dependence upon the first branch prediction in the speculative global history record.

4. The method of claim 1 wherein updating the speculative global history record with the first branch prediction includes entering a value representing the first branch prediction into a speculative global history shift register.

5. The method of claim 1 wherein updating the non-speculative global history record of branch resolutions includes entering a value representing the first branch resolution into a non-speculative global history shift register.

6. The method of claim 1 wherein using the first hash result to index the BHT includes indexing a count of the n-most recent first branch resolutions.

7. The method of claim 6 further comprising:
updating the BHT with the first branch resolution.

8. The method of claim 7 wherein updating the BHT with the first branch resolution includes:
incrementing the count in response to the first branch being taken; and,
decrementing the count in response to the first branch not being taken.

9. The method of claim 8 wherein incrementing the count includes clamping the count to a maximum value of $m=2^n-1$; and,
wherein decrementing to the count includes clamping the count to a minimum value of zero.

10. The method of claim 7 wherein using the first hash result to index the BHT of previous first branch resolutions includes indexing a BHT indicating a degree of confidence in the assumption that the first branch is taken.

11. The method of claim 10 wherein updating the BHT with the first branch resolution includes modifying the degree of confidence in response to the first branch resolution.

12. A pipelined instruction microprocessor system with a speculative global history prediction record, the system comprising:
a pipeline including a plurality of sequential stages for parallel processing microprocessor instructions, each microprocessor instruction including a plurality of consecutive operations, the pipeline including a first stage for processing a first conditional branch operation from a first microprocessor instruction;
a sequencer with an interface for accessing the pipelined stages and processing the operations;
a first address register containing a first branch address associated with the first conditional branch operation;
a speculative global history record (SGHR) having an output to supply a history of conditional branch resolutions and predictions;
a hashing circuit having an input to accept the SGHR output, an input to accept the first branch address, the hashing circuit performing an exclusive-OR (XOR) operation between a value representing the speculative global history record and a value representing the first branch address, to provide a first hash result at an output;
a branch history table (BHT) having an input to accept the first hash result, the BHT indexing previous first branch resolutions associated with the first hash result and providing a first branch prediction;
wherein the SGHR is updated with the first branch prediction;
the system further comprising:
a non-speculative global history record (NSGHR) of branch resolutions having an input to accept first branch resolutions and an output for over-writing the SGHR in response to the first branch prediction being incorrect.

13. The system of claim 12 wherein the pipeline flushes microprocessor instructions accepted subsequent to the first microprocessor instruction in response to the subsequently accepted microprocessor instructions being processed using the incorrect first branch prediction in the speculative global history.

14. The system of claim 12 wherein the speculative global history record is a shift register.

15. The system of claim 12 wherein the non speculative global history record is a shift register.

16. The system of claim 12 wherein the BHT includes a count of the n-most recent first branch resolutions.

17. The system of claim 16 wherein the BHT is updated with the first branch resolution.

18. The system of claim 17 wherein the BHT increments the count in response to the first branch instruction being taken and decrements the count in response to the first branch instruction not being taken.

19. The system of claim 18 wherein the BHT clamps the count to a maximum value of $m=2^n-1$ and clamps the count to a minimum value of zero.

20. The system of claim 17 wherein BHT first branch prediction indicates a degree of confidence in the assumption that the first branch is taken.

21. The system of claim 20 wherein the BHT first branch prediction degree of confidence is modified in response to updating the BHT with the first branch resolution.

22. In a microprocessor system using pipelined instruction processing, a method for updating a speculative global history prediction record, the method comprising:

accepting a first microprocessor instruction of consecutive operations, including a first conditional branch operation with an associated first branch address, at a first stage in a pipelined microprocessor execution process;

accessing a speculative global history record (SGHR) of conditional branch resolutions and predictions;

hashing the speculative global history record with the first branch address, creating a first hash result;

using the first hash result to index a branch history table (BHT) count of the n-most recent first branch resolutions;

in response to indexing the BHT, making a first branch prediction;

updating the speculative global history record with the first branch prediction;

resolving the first branch operation;

updating a non-speculative global history record (NSGHR) of branch resolutions with the resolution of the first branch operation; and, updating the BHT with the first branch resolutions, as follows:

incrementing the count in response to the first branch being taken, clamping the count to a maximum value of $m=2^n-1$; and, decrementing the count in response to the first branch not being taken, clamping the count to a minimum value of zero;

in response to the first branch prediction being incorrect, correcting the speculative global history record using the non-speculative global history record.

23. A pipelined instruction microprocessor system with a speculative global history prediction record, the system comprising:

a pipeline including a plurality of sequential stages for parallel processing microprocessor instructions, each microprocessor instruction including a plurality of consecutive operations, the pipeline including a first stage for processing a first conditional branch operation from a first microprocessor instruction;

a sequencer with an interface for accessing the pipelined stages and processing the operations;

a first address register containing a first branch address associated with the first conditional branch operation;

a speculative global history record (SGHR) having an output to supply a history of conditional branch resolutions and predictions;

a hashing circuit having an input to accept the SGHR output, an input to accept the first branch address, and an output to provide a first hash result;

a branch history table (BHT) having an input to accept the first hash result, the BHT indexing a count of the n-most recent first branch resolutions associated with the first hash result and providing a first branch prediction;

wherein the SGHR is updated with the first branch prediction;

the system further comprising:

a non-speculative global history record (NSGHR) of branch resolutions having an input to accept first branch resolutions and an output for over-writing the SGHR in response to the first branch prediction being incorrect; and, wherein the BHT is updated with the first branch resolutions, incrementing the count in response to the first branch instruction being taken, clamped to a maximum value of $m=2^n-1$, and decrementing the count in response to the first branch instruction not being taken, clamped to a minimum value of zero.

* * * * *